(12) United States Patent
Kolhouse et al.

(10) Patent No.: US 11,199,142 B2
(45) Date of Patent: Dec. 14, 2021

(54) SYSTEM, METHOD, AND APPARATUS FOR DRIVER OPTIMIZATION

(71) Applicant: Cummins, Inc., Columbus, IN (US)

(72) Inventors: J. Steven Kolhouse, Columbus, IN (US); Carlos Alcides Lana, Columbus, IN (US); Vivek A. Sujan, Columbus, IN (US); Phani Vajapeyazula, Columbus, IN (US); J. Stephen Wills, Columbus, IN (US); Thomas M. Yonushonis, Columbus, IN (US)

(73) Assignee: Cummins, Inc., Columbus, IN (US)

(*) Notice: Subject to any disclaimer, the term of this patent is extended or adjusted under 35 U.S.C. 154(b) by 489 days.

(21) Appl. No.: 16/153,398

(22) Filed: Oct. 5, 2018

(65) Prior Publication Data

US 2019/0093573 A1    Mar. 28, 2019

Related U.S. Application Data

(63) Continuation of application No. 14/865,529, filed on Sep. 25, 2015, now Pat. No. 10,094,308.

(51) Int. Cl.
| | |
|---|---|
| *F02D 41/00* | (2006.01) |
| *G07C 5/08* | (2006.01) |
| *F02D 41/02* | (2006.01) |
| *F02D 11/10* | (2006.01) |
| *G06Q 10/06* | (2012.01) |
| *G06Q 10/00* | (2012.01) |

(52) U.S. Cl.
CPC ........ *F02D 41/0002* (2013.01); *F02D 11/105* (2013.01); *F02D 41/021* (2013.01); *G06Q 10/00* (2013.01); *G06Q 10/06* (2013.01); *G07C 5/08* (2013.01); *G07C 5/0825* (2013.01); *F02D 2200/606* (2013.01); *F02D 2200/701* (2013.01); *Y02T 10/40* (2013.01)

(58) Field of Classification Search
CPC .. F02D 41/0002; F02D 11/105; F02D 41/021; G06Q 10/00; G06Q 10/06; G07C 5/08; G07C 5/0825
See application file for complete search history.

(56) References Cited

U.S. PATENT DOCUMENTS

| | | | |
|---|---|---|---|
| 5,566,072 A | 10/1996 | Momose et al. | |
| 6,038,505 A | 3/2000 | Probst et al. | |
| 6,246,951 B1 | 6/2001 | Robichaux et al. | |
| 6,609,064 B1 * | 8/2003 | Dean | G07C 5/008 342/357.68 |
| 9,852,625 B2 * | 12/2017 | Victor | G08G 1/167 |

(Continued)

*Primary Examiner* — Jean Paul Cass
(74) *Attorney, Agent, or Firm* — Foley & Lardner LLP

(57) ABSTRACT

The systems, methods, and apparatuses provided herein disclose interpreting a performance criteria for a vehicle, wherein the performance criteria is indicative of a desired operating parameter for the vehicle; interpreting a good driver definition value indicative of a good driver profile for the interpreted performance criteria; determining a performance value indicative of how an operator of the vehicle is performing with respect to the good driver definition value; and in response to the performance value indicating that the vehicle is not satisfying the performance criteria, managing an actuator output response value for at least one actuator in the vehicle to facilitate achievement of the good driver definition value.

16 Claims, 3 Drawing Sheets

(56) References Cited

U.S. PATENT DOCUMENTS

| | | |
|---|---|---|
| 10,613,531 B2 * | 4/2020 | Minegishi ............ G05D 1/0061 |
| 2002/0128751 A1 | 9/2002 | Engstrom et al. |
| 2005/0288850 A1 | 12/2005 | Sato |
| 2008/0104954 A1 * | 5/2008 | Schifferer ............. E02F 9/2235 60/431 |
| 2008/0120175 A1 | 5/2008 | Doering |
| 2010/0030458 A1 | 2/2010 | Coughlin |
| 2010/0209889 A1 | 8/2010 | Huang et al. |
| 2011/0166773 A1 | 7/2011 | Raz et al. |
| 2012/0173075 A1 | 7/2012 | Mays |
| 2013/0197715 A1 | 8/2013 | Otanez et al. |
| 2013/0297185 A1 * | 11/2013 | Morris ................. F02D 11/105 701/104 |
| 2013/0340721 A1 * | 12/2013 | Suda ................. F02M 37/0058 123/496 |
| 2014/0188379 A1 | 7/2014 | Gostoli et al. |
| 2014/0278574 A1 * | 9/2014 | Barber ................. B60W 40/09 705/4 |
| 2015/0006066 A1 * | 1/2015 | Stevens ................. F02D 35/027 701/115 |
| 2016/0244039 A1 * | 8/2016 | Rizzo ...................... B60T 8/322 |
| 2017/0129491 A1 * | 5/2017 | Tatourian ......... G08G 1/096775 |
| 2019/0176837 A1 * | 6/2019 | Williams .............. B60W 50/02 |
| 2020/0193869 A1 * | 6/2020 | Shuman .............. G09B 19/167 |
| 2020/0387156 A1 * | 12/2020 | Xu ........................ B60W 10/18 |

\* cited by examiner

SYSTEM, METHOD, AND APPARATUS FOR DRIVER OPTIMIZATION

CROSS-REFERENCE TO RELATED APPLICATION

This application is a continuation of U.S. application Ser. No. 14/865,529, filed Sep. 25, 2015 and entitled "System, Method, and Apparatus for Driver Optimization," which is incorporated herein by reference in its entirety.

TECHNICAL FIELD

The present disclosure relates to a system, method, and apparatus for improving performance of an operator of a vehicle.

BACKGROUND

Driver variability is a large factor in vehicle performance, such as in regard to fuel economy and emissions. For example, Driver A may consistently gradually accelerate a vehicle while Driver B consistently demands high acceleration (e.g., depresses the accelerator pedal more than fifty percent each time acceleration is desired). As a result, Driver B may achieve relatively worse fuel economy than Driver A. This undesirable trait will be even more true in the future as other automated optimizations take performance variability out of the equation, leaving the variability of driver performance as the largest remaining piece.

However, driver performance management is notoriously difficult in the controls universe, as drivers have infinite capacity to vary behavior in response to control variations. Further, previous driver management schemes are punitive—limiting available torque or speed in response to suboptimal driver performance—or extremely simple (e.g., providing greater speed or power in cruise control). These schemes can be effective, but only in a limited manner as they cannot help poor drivers imitate the behaviors of good drivers, but merely reduce the consequences of poor driving performance. Additionally, previously known systems cannot adapt to multiple drivers, meaning if a good driver follows a poor driver, or a poor driver follows a good driver, the system will not respond in the desired manner, and additionally the system may have a fixed response to a poor driver even though the driver may be poor for different reasons or at different operating conditions. In this regard, such systems tend to be binary, where the reward or penalty is present or not, and accordingly, they cannot adjust response time in an intelligent manner. Still further, presently known systems cannot affect the dynamic behavior of the vehicle to the driver, because they only affect limits or maximum values (speed or torque limits, benefits in max gear cruising, etc.) and do not affect transient behavior where many of the losses in efficiency from poor driving are likely to occur. Thus, a need exists for improved driver optimization systems, methods, and apparatuses.

SUMMARY

Various embodiments disclosed herein relate to systems, methods, and apparatuses for identifying, defining, and determining traits of determined "good drivers" to improve driver operability of a vehicle.

One embodiment relates to an apparatus. The apparatus includes a performance criteria module structured to interpret a performance criteria for a vehicle; a behavior module structured to interpret a good driver definition value, wherein the good driver definition value includes a definition for relating an actuator response value to an actuator input value for at least one actuator of the vehicle; an operating condition module structured to interpret vehicle operation data indicative of an operating condition of the vehicle; and an actuator module communicably coupled to the performance criteria module, the behavior module, and the operating condition module, wherein the actuator module is structured to manage a response value of the at least one actuator of the vehicle in response to the performance criteria and the good driver definition value based on the interpreted operating condition.

Another embodiment relates to a vehicle. The vehicle includes an engine; a throttle system operatively coupled to the engine; and a controller communicably and operatively coupled to the engine and the throttle system. According to one embodiment, the controller is structured to: interpret a performance criteria for the vehicle, wherein the performance criteria is indicative of a desired operating parameter for the vehicle; interpret a good driver definition value indicative of a good driver profile for the interpreted performance criteria; determine a performance value indicative of how an operator of the vehicle is performing with respect to the good driver definition value; and in response to the performance value indicating that the vehicle is not satisfying the performance criteria, managing an actuator output response value for at least one actuator in the vehicle to facilitate achievement of the good driver definition value.

Yet another embodiment relates to a method. The method includes interpreting a performance criteria for a vehicle, wherein the performance criteria is indicative of a desired operating parameter for the vehicle; interpreting a good driver definition value indicative of a good driver profile for the interpreted performance criteria; determining a performance value indicative of how an operator of the vehicle is performing with respect to the good driver definition value; and in response to the performance value indicating that the vehicle is not satisfying the performance criteria, managing an actuator output response value for at least one actuator in the vehicle to facilitate achievement of the good driver definition value.

These and other features, together with the organization and manner of operation thereof, will become apparent from the following detailed description when taken in conjunction with the accompanying drawings.

DESCRIPTION OF ILLUSTRATIVE EMBODIMENTS

Figure 1:
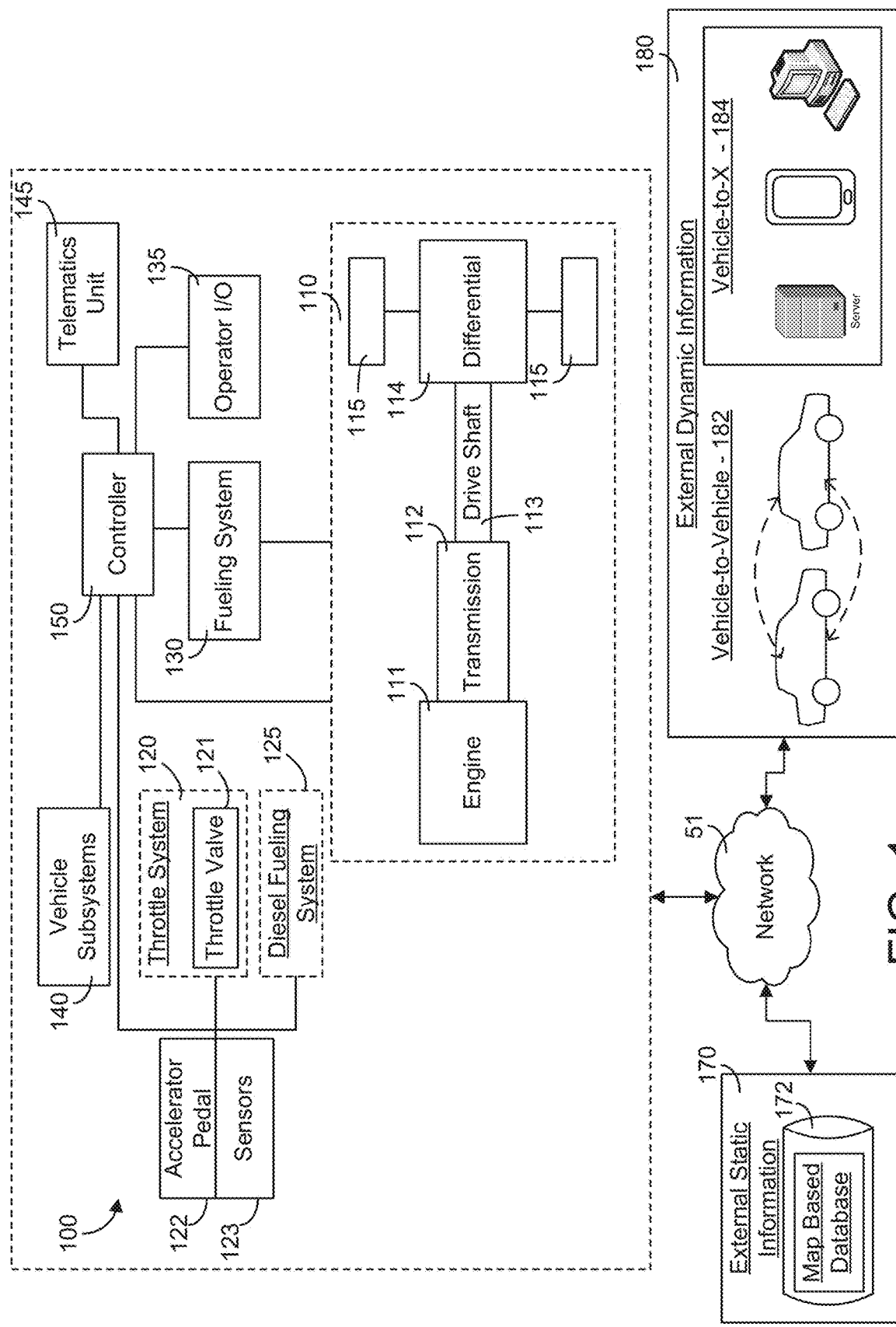
FIG. 1 is a schematic diagram of an intelligent transportation system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the present disclosure relates to systems, methods, and apparatuses for driver optimization. The system, method, and apparatus provides for driver optimization that adjusts dynamic behaviors rather than just limits, that assists a poor driver in performing like a superior driver, and that accounts for multiple drivers either explicitly or through variable response time constants. The system, method, and apparatus may additionally respond to dynamic driver behavior to enforce and teach more efficient driving in the presence of a dynamic responsive operator. In operation, the system, method, and apparatus may determine a good driver profile through defined values, empirically, and/or both, and manipulate the driver-vehicle interface to move the behavior of a poor driver closer to the behavior of the more efficient "good" driver.

According to the present disclosure, a controller interprets a performance criteria indicative of a desired operating characteristic for a vehicle, such as a desire to maximize fuel economy, minimize nitrous oxide (NOx) emissions, etc. The controller may also interpret a good driver definition value that is indicative of how a predefined good driver may handle various operating conditions in order to achieve the designated performance criteria. The good driver definition value may be predefined in the controller, received from an external communications network (e.g., via an intelligent transportation system), and/or determined based on acquired data. Further, the good driver definition value may be specific to a predefined route for the vehicle or applied more generally (e.g., always on and independent of a route of the vehicle). The good driver definition value may include an actuator response value for certain operating conditions of the vehicle, where the actuator response value corresponds with "good driver" responses. For example and to achieve relatively better fuel economy, the predefined good driver may gently and slowly depress an accelerator pedal in the vehicle (in contrast, the predefined bad driver for fuel economy may rapidly depress the acceleration pedal). To teach and/or promote achievement of a desired fuel economy, the controller may at least one of adjust an actuator response value, such as a re-mapping of the throttle table, or provide an instruction to a display device in the vehicle for instructing the driver. In the first instance, the throttle map be adjusted to account for the rapid depression of the pedal, e.g., rather than the full depression opening the throttle valve 70%, the throttle table may be re-mapped to only open the throttle valve 30% for the same or substantially the same throttle command. In this instance, the vehicle may achieve better fuel economy by following the predefined good driver definition value without the operator or driving have to adjust his/her driving style because the throttle input command remains substantially constant. This may be beneficial for operators desiring a better achievement of one or more performance criteria without having to drastically change their style. In the latter example instance, a display device may indicate to the operator the correct or most correct actuator input value for a desired actuator output response value (e.g., accelerator pedal should be depressed half as far as it current is now). In this regard, the controller of the present disclosure may teach "bad driver(s)" to become better drivers with respect to one or more performance criteria. These and other features of the present disclosure are described more fully herein.

Referring now generally to FIG. 1, a schematic diagram of an intelligent transportation system is shown according to one embodiment. The intelligent transportation system (ITS) 50 is structured to provide an environment that facilitates and allows the exchange of information or data (e.g., communications) between a vehicle, such as vehicle 100, and one or more other components or sources. In this regard and for example, the ITS 50 may include telematics systems that facilitate the acquisition and transmission of data acquired regarding the operation of the vehicle 100. As shown and generally speaking, the ITS 50 includes a vehicle 100 communicably coupled via a network 51 to each of an external static information source 170 and an external dynamic information source 180, where the term "external" refers to a component or system outside of the vehicle 100.

The network 51 may be any type of communication protocol that facilitates the exchange of information between and among the vehicle 100 and the external static and dynamic information sources 170 and 180. In this regard, the network 51 may communicably couple the vehicle 100 with each of the external static and dynamic information sources 170 and 180. In one embodiment, the network 51 may be configured as a wireless network. In this regard, the vehicle 100 may wirelessly transmit and receive data from at least one of the external static and dynamic information sources 170 and 180. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 150 and/or telematics unit 145 of the vehicle 100 may electrically, communicably, and/or operatively couple via a fiber optic cable to the network 51 to selectively transmit and receive data wirelessly to and from at least one of the external static and dynamic information sources 170 and 180.

The external static information source 170 may be any information (e.g., data, value, etc.) provider capable of providing external static information, where external static information refers to information or data that may vary as a function of position (e.g., the curvature or grade of the road may vary along a route) but is substantially unchanging with respect to time. In this regard, the external static information source 170 may include one or more map based databases 172, where the map based database 172 includes static information including, but not limited to, route data for various locations or positions along a designated route. Accordingly, the route data may include road grade data (e.g., the road grade at various spots along various routes), speed limit data (e.g., posted speed limits in various road locations), elevation or altitude data at various points along a route, curvature data at various points along a route, location of intersections along a route, a speed limit at a location along the route, etc. That is to say, the external static information may include any type of data about the environment around the vehicle that does not typically change in short time intervals. It should be understood that the present disclosure contemplates other sources of external static information (e.g., a global positioning system satellite that provides latitude, longitude, and/or elevation data; and/or a look ahead electronic horizon pre-calibrated map), such that the database configuration is not meant to be limiting or intended to be the only type of static information source contemplated.

The external dynamic information source 180 may be any external dynamic information (e.g., data, value, etc.) provider, where external dynamic information refers to information or data that may vary as a function of both time and location (e.g., weather conditions). In this regard, the external dynamic information source 180 may include any source capable of providing the external dynamic information. Accordingly, the external dynamic information source 180 may include vehicle-to-vehicle 182 communications. In this regard, the vehicle 100 may communicate with one or more other vehicles directly (e.g., via NFC, etc.) to obtain data regarding one or more upcoming conditions for the vehicle 100. In another embodiment, the external dynamic information source 180 may include a vehicle-to-X 184 configuration, where the "X" refers to any remote information providing source. For example and as shown in FIG. 1, the remote information providing source may include one or more servers, computers, mobile devices, etc. That is to say, the external dynamic information includes data regarding the dynamic nature of the environment around the vehicle, where the dynamic information may be provided from an on-board source (e.g., cameras, ultrasonics, radar, etc.) and/or an off-board source (e.g., other vehicles, grid, infrastructure, servers, etc.). Accordingly, the external dynamic information may include, but is not limited to, a traffic condition at a particular location at a particular time, a weather condition at a particular location at a particular time, fleet data concerning one or more vehicles within the fleet, etc. Like the external static information sources 170, it should be understood that the present disclosure contemplates other sources of external dynamic information sources, such that the depicted examples are not meant to be limiting or intended to be the only type of dynamic information source contemplated.

Referring now to the vehicle 100 of FIG. 1, the vehicle 100 is communicably coupled with each of the external static and dynamic sources 170, 180 via the network 51. The vehicle 100 may be an on-road or off-road vehicle including, but not limited to, cars, trucks, boats, vans, airplanes, or any other type of vehicle. The vehicle 100 is shown to generally include a controller 150 communicably and operatively coupled to a powertrain system 110, a throttle system 120 or a diesel fueling system 125, a fueling system 130, an operator input/output (I/O) device 135, one or more additional vehicle subsystems 140, and a telematics unit 145. It should be understood that the vehicle 100 may include additional, less, and/or different components/systems than depicted in FIG. 1, such that the principles, methods, systems, apparatuses, processes, and the like of the present disclosure are intended to be applicable with any other vehicle configuration. It should also be understood that the principles of the present disclosure should not be interpreted to be limited to on-highway vehicles; rather, the present disclosure contemplates that the principles may also be applied to a variety of other applications including, but not limited to, off-highway construction equipment, mining equipment, marine equipment, locomotive equipment, etc.

The powertrain system 110 facilitates power transfer from the engine 111 to power the vehicle 100. The powertrain system 110 includes an engine 111 operably coupled to a transmission 112, a drive shaft 113, and a differential 114, where the differential 114 transfers power output from the engine 111 to the final drive (shown as wheels 115) to propel the vehicle 100. As a brief overview and in this configuration, the engine 111 is structured as an internal combustion engine that receives a chemical energy input (e.g., a fuel such as gasoline, ethanol, or diesel) from the fueling system 130, and combusts the fuel to generate mechanical energy, in the form of a rotating crankshaft. The transmission 112 receives the rotating crankshaft and manipulates the speed of the crankshaft (i.e., the engine RPM) to effect a desired drive shaft 113 speed. The rotating drive shaft 113 is received by a differential 114, which provides the rotation energy of the drive shaft 113 to the final drive 115. The final drive 115 then propels or moves the vehicle 100.

The engine 111 may be structured as any internal combustion engine (e.g., compression-ignition or spark-ignition), such that it can be powered by any fuel type (e.g., diesel, ethanol, gasoline, etc.). Similarly, the transmission 112 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 111 and the transmission 112, the drive shaft 113, differential 114, and final drive 115 may be structured in any configuration dependent on the application (e.g., the final drive 115 is structured as wheels in an automotive application and a propeller in an airplane application). Further, the drive shaft 113 may be structured as a one-piece, two-piece, and a slip-in-tube driveshaft based on the application.

In other embodiments, the engine 111 may be structured as a full electric engine, a hybrid engine comprising an electric power system with an internal combustion engine, or only a full internal combustion engine like described above. In this regard, the vehicle 100 may be generally configured as any one of a variety of types of vehicles, such as a full electric vehicle, a hybrid powered vehicle, or a typical internal combustion engine powered vehicle. Accordingly, while the systems, methods, and apparatuses described herein are primarily in regard to an internal combustion engine powered vehicle, it should be understood that the systems, methods, and apparatuses also applicable with the other aforementioned vehicle types.

As shown, the vehicle 100 includes either a throttle system 120 or a diesel fueling system 125 to signify that the vehicle may be driven by a spark-ignition engine (throttle system 120) or a compression-ignition engine (diesel fueling system 125).

In regard to the spark-ignition engine configuration, the throttle system 120 is structured to at least partly control the power output from the vehicle (in turn, the vehicle 100 speed) based on the operator or driver commands (e.g., depression of the accelerator pedal). More particularly, the throttle system 120 is structured to control the charge (air+fuel) to the engine 111 to control the power output from the engine 111. As shown, the throttle system 120 generally includes a throttle valve 121, which is operatively and communicably coupled to an accelerator pedal 122 and one or more sensors 123. The accelerator pedal 122 may be structured as any type of acceleration device included with a vehicle (e.g., a floor-based pedal, an acceleration lever, etc.). Further, the sensors 123 may include any type of sensors included with a throttle system 120 (or diesel fueling system 130) of a vehicle. For example, the sensors 123 may include an accelerator pedal position sensor that acquires data indicative of a depression amount of the pedal (e.g., a potentiometer), a throttle valve position sensor that acquires data indicative of how open or closes the throttle valve is, a mass air flow rate sensor that acquires data indicative of an intake amount of air flowing to the engine 111, a fuel temperature sensor, a charge air temperature sensor, a coolant temperature and pressure sensor, an ambient air temperature and pressure sensor, a fuel pressure sensor, an injection pump speed sensor, and the like.

The throttle valve 121 is structured to selectively control the amount of intake air provided to the engine 111. As such, the throttle valve 121 may have any type of structure typically used with vehicles. For example, the throttle valve 121 may include, but is not limited to, a ball valve, a butterfly valve, a globe valve, or a plug valve. Because the type of engine 111 may vary from application-to-application, the type of throttle valve may also vary with all such possibilities and configurations falling within the spirit and scope of the present disclosure.

In the example depicted, the throttle system 120 is structured as an electronic-controlled throttle valve. In this configuration, an accelerator pedal position sensor acquires data indicative of the depression amount of the accelerator pedal and provides this position data to the controller 150. Responsive to the determined position, the controller 150 opens or closes the throttle valve 121 to correspond with the determined accelerator pedal position. In this regard, a motor may be operatively coupled to the throttle valve 121, where the motor is driven to open/close the valve 121. In operation, the controller 150 may receive various other vehicle operation data (e.g., engine speed, engine torque, load, etc.). Using one or more algorithms (e.g., look-up tables, models, etc.), the controller 150 may determine the throttle position needed or likely needed to achieve or maintain a desired operating condition (e.g., vehicle speed). For example, one or more throttle maps may be included with the controller. The throttle map(s) may relate an engine speed to engine torque as a function of the position of the throttle valve. Therefore, to maintain a desired vehicle speed, the controller may back-calculate the torque and speed needed and then look-up or recall the corresponding throttle valve position. The controller 150 may then transmit, send, and/or provide a command to the motor of the throttle valve 121 to open/close the valve 121 to that position. The valve 121 then controls the amount of intake air to the engine 111. Indirectly and in response, based on this amount and rate of intake air to the engine 111, the fueling system 130 controls the amount of fuel injected into a cylinder of the engine 111. The fueling system 130 (based on a variety of vehicle operating parameters) determines the quantity of fuel required or substantially required for combustion based on the intake amount of air. In this regard, the throttle system 120 indirectly controls the amount of fuel used for combustion. Further, in regard to the spark-ignition engine configuration, the fueling command may be based on achieving stoichiometric combustion conditions.

While the throttle system 120 of the present disclosure is described herein as an electronic throttle system, in an alternate embodiment, the throttle system may be structured as a non-electronic throttle system. In this embodiment, a mechanical linkage connects the accelerator pedal to the throttle valve, such that the depression amount of the accelerator directly corresponds with an open/close amount of the throttle valve. In this configuration, the controller 150 may improve, teach, and/or achieve one or more performance criteria through instructions provided via the I/O device 135.

In conventional electronic throttling systems, a default map is used to control the position of the throttle valve responsive to the accelerator pedal position, engine torque, and engine speed. Not only does this conventional or default map fail to consider a performance criteria like the present disclosure, but the conventional or default map fails to provide dynamic adjustability in response to a skill level of the driver of the vehicle and/or a desired characteristic of the performance criteria.

In comparison, the diesel fueling system 125 may receive position data indicative of a position of the accelerator pedal 122 from the sensors 123 and, in response, determine a torque command. In this regard, the diesel fueling system 125 relates or maps a position of the accelerator pedal 122 to a torque command desired. In response to the determined torque command, the fuel system 130 provides a fueling command (e.g., injection location, injection timing, and injection amount) to achieve or substantially achieve the torque command for a given engine speed. Thus, whereas the spark-ignition engine relates or maps accelerator pedal position to throttle valve position. In this configuration, the map relates the accelerator pedal position to a torque command for a given engine speed. It should be understood that in other embodiments, the diesel fueling system 125 may map or relate an engine speed to accelerator pedal position to control fueling and power output, such that the torque command mapping is not meant to be limiting.

It should also be understood that other or additional inputs to control fueling and power output may be used. For example, in regard to the diesel fueling system 125, additional inputs may include an engine speed, characteristics of the fueling system (e.g., timing, quantity, rate, etc.), characteristics of any glow plugs or heater elements, characteristics regarding the exhaust aftertreatment system, crankshaft position, brake and clutch position/operation, battery voltage, temperatures (e.g., air, oil, fuel, coolant, etc.), pressures (e.g., intake air, fuel, oil, etc.), and so on.

According to the present disclosure, the controller 150 may dynamically alter the diesel fueling system map (e.g., accelerator pedal position to torque output (and, consequently, a fueling command), etc.) in response to a skill level of the driver of the vehicle and/or a desired characteristic of the performance criteria. Advantageously, adjustment of the map may improve the skill of the driver or, make the less skilled driver operate the vehicle like a more skilled driver with respect to one or more desired performance criteria.

As briefly described above, the fueling system 130 is structured to provide fuel to the engine 111. The fueling system 130 may include any component that may be included in a fueling system 130, such as one or more fuel injectors, spark plugs, electrical wires, a power source (such as a battery), fuel supply and providing lines, sensors (e.g., fuel flow sensors, fuel tank capacity sensors), fuel tank(s), and so on.

The operator I/O device 135 enables an operator of the vehicle to communicate with the vehicle 100 and the controller 150. Analogously, the I/O device 135 enables the vehicle or controller 150 to communicate with the operator. For example, the operator I/O device 135 may include, but is not limited, an interactive display (e.g., a touchscreen, etc.) having one or more buttons/input devices, an accelerator pedal, a clutch pedal, a shifter for the transmission, a cruise control input setting, etc. Via the input/output device 135, the operator can designate one or more performance criteria, such as an acceleration characteristic, a fuel economy characteristic, an emissions characteristic, etc. Further, via the I/O device 135, the controller 150 can also provide commands/instructions/information to the operator (or a passenger). In this regard, the controller 150 may teach the operator/driver to become a good driver, as described herein below.

As also shown, the vehicle 100 includes one or more vehicle subsystems 140. The various vehicle subsystems 140 may generally include one or more sensors (e.g., a speed sensor, torque sensor, intake manifold pressure sensor, ambient pressure sensor, temperature sensor attached to the engine, etc.), as well as any subsystem that may be included with a vehicle. Accordingly, the subsystems 140 may also include an exhaust aftertreatment system. The exhaust aftertreatment system can include any component used to reduce diesel exhaust emissions, such as selective catalytic reduction catalyst, a diesel oxidation catalyst, a diesel particulate filter, a diesel exhaust fluid doser with a supply of diesel exhaust fluid, and a plurality of sensors for monitoring the aftertreatment system (e.g., a NOx sensor). In this regard, the exhaust aftertreatment system is structured to receive the exhaust from the combustion process in the engine 111 and reduce the emissions from the engine 111 to less environmentally harmful emissions (e.g., reduce the NOx amount, reduce the emitted particulate matter amount, etc.).

The vehicle 100 is also shown to include a telematics unit 145. The telematics unit 145 may be structured as any type of telematics control unit. Accordingly, the telematics unit 145 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 145 and one or more remote devices (e.g., a provider/manufacturer of the telematics device, etc.). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 145 may also include a communications interface for communicating with the controller 150 of the vehicle 100. The communication interface for communicating with the controller 150 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 150 and the telematics unit 145. In other embodiments, a local area network (LAN), a wide area network (WAN), or an external computer (for example, through the Internet using an Internet Service Provider) may provide, facilitate, and support communication between the telematics unit 145 and the controller 150. In still another embodiment, the communication between the telematics unit 145 and the controller 150 is via the unified diagnostic services (UDS) protocol. All such variations are intended to fall within the spirit and scope of the present disclosure.

The controller 150 is communicably and operatively coupled to the powertrain system 110, the throttle system 120, the fueling system 130, the operator I/O device 135, the one or more vehicle subsystems 140, and the telematics unit 145. Communication between and among the components may be via any number of wired or wireless connections (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data. Because the controller 150 is communicably coupled to the systems and components in the vehicle 100 of FIG. 1, the controller 150 is structured to receive data (e.g., instructions, commands, signals, values, etc.) from one or more of the components shown in FIG. 1.

Further, as the components of FIG. 1 are shown to be embodied in a vehicle 100, the controller 150 may be structured as an electronic control unit (ECU), such as an engine control module. The ECU may include a transmission control unit and any other control unit included in a vehicle (e.g., exhaust aftertreatment control unit, powertrain control module, etc.). The function and structure of the controller 150 are shown described in greater detail in FIG. 2.

Figure 2:
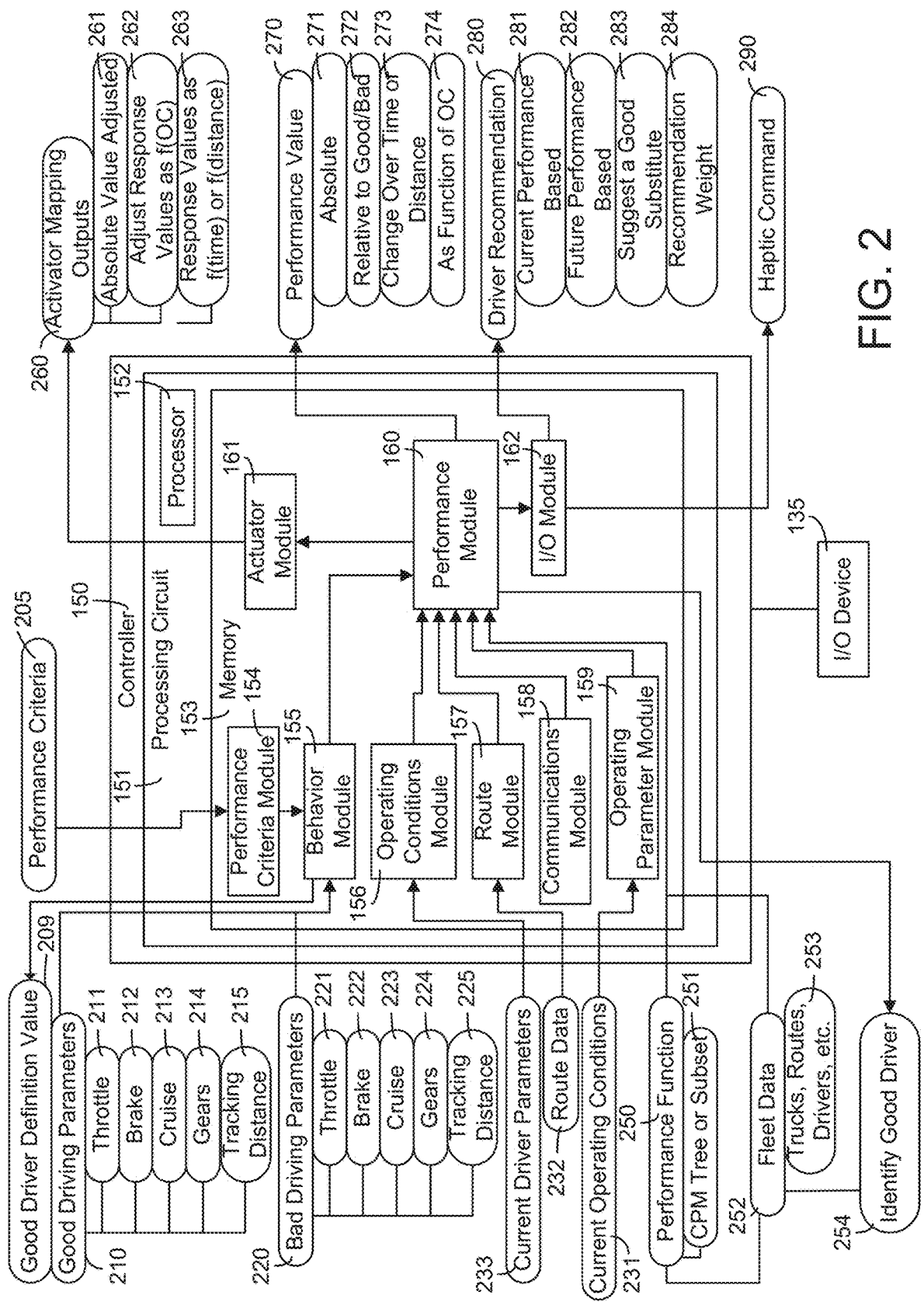
FIG. 2 is a schematic diagram of the controller of FIG. 1, according to an example embodiment.

Accordingly, referring now to FIG. 2, the function and structure of the controller 150 are shown according to one example embodiment. The controller 150 is shown to include a processing circuit 151 including a processor 152 and a memory 153. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 153 (e.g., NVRAM, RAM, ROM, NVRAM, Flash Memory, hard disk storage, etc.) may store data and/or computer code for facilitating the various processes described herein. Thus, the one or more memory devices 153 may be communicably connected to the controller 150 and provide computer code or instructions to the controller 150 for executing the processes described in regard to the controller 150 herein. Moreover, the one or more memory devices 153 may be or include tangible, non-transient volatile memory or non-volatile memory. Accordingly, the one or more memory devices 153 may include database components, object code components, script components, or any other type of information structure for supporting the various activities and information structures described herein.

The memory 153 is shown to include various modules for completing the activities described herein. More particularly, the memory 153 includes modules a performance criteria module 154, a behavior module 155, an operating condition module 156 have a route module 157 and a communications module 158, an operating parameter module 159, a performance module 160, an actuator module 161, and an input/output (I/O) module 162. The modules are adapted or configured to provide a driver optimization routine that adjusts dynamic behaviors and, among other features, assists poor drivers to improve to become better drivers. In one embodiment, the improvement may be automatic or nearly automatic such that explicit driver inputs are avoided or substantially unneeded. In another embodiment, the improvement may be via a display device (e.g., I/O device 135), such that the present disclosure may teach the driver to become a better driver. While various modules with particular functionality are shown in FIG. 2, it should be understood that the controller 150 and memory 153 may include any number of modules for completing the functions described herein. For example, the activities of multiple modules may be combined as a single module, as additional modules with additional functionality may be included, etc.

Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The performance criteria module 154 is structured to receive one or more performance criteria 205. The performance criteria 205 is indicative of a desired operating parameter for the vehicle 100. In one embodiment, the performance criteria module 154 may include the I/O device 135 or any other hardware component (e.g., communication circuitry) for facilitating the reception of the performance criteria 205. In another embodiment, the performance criteria module 154 may include machine-readable content for receiving and storing the performance criteria 205. In still another embodiment, the performance criteria module 154 may include any combination of hardware components and machine-readable content.

The performance criteria 205 may include, but is not limited to, a fuel economy (e.g., whether the operator desires a high fuel economy or is less concerned for the fuel economy of the vehicle 100); a wear/maintenance value (e.g., an amount of acceptable amount of usage of the oil for the vehicle, transmission fluid for the vehicle, tires for the vehicle (e.g., "I am comfortable driving on these vehicles for 5,000 miles before they should be inspected and/or replaced.")), etc.; an emissions value (e.g., a NOx emissions threshold for transient operating conditions (e.g., acceleration conditions) and steady-state conditions (e.g., cruise control operation), a particulate matter emissions amount that is acceptable, etc.); an acceleration characteristic (e.g., acceleration from 0-60 miles-per-hour, accelerate from 55-60 MPH, etc.); a value for transmission shifts (e.g., a desire to reduce/have infrequent transmission shifts due to the loss of power in between shifts and the relatively worse fuel economy realized from a high number of transmission shifts); etc. It should be understood that the aforementioned performance criteria 205 list is not meant to be exhaustive as other desired performance criteria may be used with the controller 150 without deviating from the spirit and scope of the present disclosure.

The performance criteria 205 may be defined in a variety of manners. One such definition may include defining the performance criteria 205 in absolute terms. An absolute term may include a predefined threshold indicative of an acceptable or tolerable quantity or value for a particular performance criteria. For example, the user may define an acceptable fuel economy as twenty (20) miles-per-gallon (MPG), which serves as threshold: values below 20 MPG are considered unacceptable and may prompt one or more different actuator output responses whereas values above 20 MPG may be considered acceptable. The absolute term may also include an acceptable or tolerable range. For example, the user may desire between 17 and 22 MPG, and no more or less because if the user is obtaining more than 22 MPG then the user may be sacrificing available power output from the engine (due to conservative driving) while rates below 17 MPG may indicate that the user is sacrificing too much available power output for the operator's desires.

Another such definition may be to define the performance criteria 205 relative to a predefined good or bad driver value. For example, for similar vehicles, the performance criteria 205 may be designated as within ten percent of the corresponding performance criteria for a good driver definition value (e.g., if the good driver achieves 3 MPG when fully loaded in a semi-tractor trailer application, the user may desire to achieve 3 MPG+/−0.3 MPG—i.e., a relative term). This definition and relative amounts may also be applied to bad driver performance criteria.

Still another such definition may be to define the performance criteria 205 versus time. In this regard, the operator may define a desired operating characteristic of a performance criteria over time. The same principle may also be applied as a function of distance. For example, the user may wish to achieve 22 MPG over the trip, where the trip is at least one of time-based and/or distance-based (e.g., 1 hour, 50 miles, etc.). The performance criteria, 22 MPG, may be further defined to be an average (as compared to a median value, etc.). Therefore, as long as the average of the trip is 22 MPG, then the performance criteria 205 is met even if there are fluctuations below 22 MPG.

Yet another such definition may be to define the performance criteria 205 as a function of the operating condition. As described herein below, the operating condition (described herein below) may define the current (or future, based on data from the route module 157 or communications module 158) that is indicative of the conditions currently experienced by or likely to be experienced by in the future by the vehicle 100. For example, the operating condition may be indicative of a traveling altitude for the vehicle 100, which in turn affects the intake air amount and consequently fueling amount. The operating condition may also indicate if the vehicle 100 (or component thereof, such as the engine 111) is operating in steady-state or transient conditions. As such, the performance criteria 205 may be based on a certain (one or more) operating condition detected or determined by the controller 150. For example, during traveling at grades above 3%, the performance criteria may be 5 MPG while during travel at grades below 1%, the performance criteria may be 7 MPG.

The aforementioned definitional list for the performance criteria 205 is not meant to be exhaustive as the present disclosure contemplates any and all other types of variations relative to the aforementioned list.

In response to designation of one or more performance criteria 205, the performance criteria module is structured to provide the designation to the behavior module 155. As such, the behavior module 155 is communicably coupled to the performance criteria module 154 and may include, among other components, communication circuitry for communicably coupling and providing for the exchange of data, information, messages, signals, and the like between the modules 154 and 155. In another embodiment, the behavior module 155 may include any combination of machine-readable content and hardware components.

Responsive to the performance criteria 205, the behavior module 155 is structured to interpret at least one of a good driver definition value 209 and a bad driver definition value. The good driver definition value 209 represents operating parameters for a "good driver." In this regard, the good driver definition value 209 is indicative of a good driver profile, where the good driver profile may be based on at least one of an operating condition (e.g., good driving parameters for this operating condition are X), a designated performance criteria (e.g., good driver parameters for this performance criteria are X), an identified good driver by the operator or by a remote manager, or some combination therewith. Accordingly, the good driving parameters, shown as good driving parameters 210, may be predefined, based on acquired data for the operator (i.e., tracked), based on one or more operating conditions for the vehicle, based on external static or dynamic information (e.g., a fleet manager may define the good driving parameters 210 via the network 51, fleet data for a plurality of vehicles may be used to identify the good driving parameters 210, etc.), and/or some combination therewith. In comparison, a bad driver definition value refers to operating parameters indicative of a "bad driver." Accordingly, the bad driving parameters, shown as bad driving parameters 220, may be predefined, based on acquired data for the operator (i.e., tracked), based on one or more operating conditions for the vehicle, based on external static or dynamic information (e.g., a fleet manager may define the bad driving parameters 220 via the network 51, fleet data for a plurality of vehicles may be used to identify the good driving parameters 210, etc.), and/or some combination therewith.

As used herein, the term "vehicle operating parameter(s)" including the good driving parameters 210 and the bad driving parameters 220 generally refers to the operating parameters of the vehicle 100 and components thereof (e.g., the engine 111). That is to say, vehicle operating parameters refer to operating conditions regarding the vehicle itself (and the components thereof). For example, vehicle operating parameters may include, but are not limited to, a vehicle speed, an engine torque, an engine speed, an emissions output with respect to one or more exhaust gas constituents (e.g., a NOx output, etc.), an output power, a characteristic of a battery or other component in an electrical system for the vehicle 100 (e.g., a charge level of the battery), a characteristic of the throttle system 120 (e.g., a throttle valve position, an air intake amount/rate, etc.), a fluid consumption rate (e.g., fuel consumption rate, diesel exhaust fluid consumption rate, etc.), any received engine/vehicle faults (e.g., a fault code indicating a low amount of diesel exhaust fluid), engine operating characteristics, and so on.

In comparison, the term "vehicle operating condition(s)" or "operating condition" refers to and is indicative of one or more conditions imparted onto the vehicle 100. For example, the operating condition may include, but is not limited to, a predefined trip/route for the vehicle 100, an altitude level, a drafting condition (e.g., a following distance relative to another vehicle), the grade that the vehicle is on (e.g., uphill grade, downhill grade, relatively flat grade), the curvature of the route that the vehicle is on, an ambient temperature, an ambient pressure, a weather condition (e.g., rain, sleet, snow, etc.), a terrain (e.g., asphalt, gravel, etc.), and the like. As alluded to above, the vehicle operating condition may affect/impact one or more vehicle operating parameters that in turn affects the "good driver" or "bad driver" profile. For example, two vehicles, Vehicle A and Vehicle B, may have identical configurations (e.g., same weight, type, etc.) but Vehicle A is traveling on a grade above 3% at 55 miles-per-hour (MPH) while Vehicle B is traveling on a grade that is relatively flat at 55 MPH. Due to the upgrade travel of Vehicle A, Vehicle A utilizes relatively more power output than Vehicle B which consequently results in relatively worse fuel economy for Vehicle A than Vehicle B. As such, a good driving parameter 210 for throttle position 211 may differ for Vehicle A than Vehicle B. To account for the effect of operating condition on one or more vehicle operating parameters, the good driving parameters 210 and bad driving parameters 220 may be configured as a function of operating condition. An analogous process may be used with diesel engines: the torque command for Vehicle A may differ from Vehicle B for the same stretch of route where Vehicle A is achieving, likely to achieve, or has achieved better fuel economy than Vehicle B. As such, a good driving parameter 210 may correspond with the torque command of Vehicle A for that part of the route.

Based on the foregoing, the good driving parameters 210 may include, but are not limited to, a throttle position 211, a brake characteristic 212 (e.g., frequency of applying brakes, how long brakes are held for, etc.), a cruise characteristic 213 (e.g., an upper/lower droop, a droop rate, a set point relative to a posted speed limit for a "good driver", etc.) a transmission setting characteristic 214 (e.g., a transmission setting for a "good driver" for various vehicle speeds, a number of shifts for different operating conditions, etc.), a tracking distance characteristic 215 (e.g., a following distance for a "good driver" for certain operating conditions, etc.), a torque command for diesel engines, etc. In a similar fashion, the bad driving parameters 220 may include the complementary "bad" values of throttle position 221, brake characteristic 222, a cruise characteristic 223, a transmission setting characteristic 224, and/or a tracking distance 225. It should be understood that the aforementioned list of vehicle operating parameters (and, consequently, good driving parameters 210 and bad driving parameters 220) is not meant to be exhaustive as additional, less than, and/or other parameters may also be used to represent a good driving and/or a bad driving profile.

As alluded to above, the good driving parameters 210 and bad driving parameters 220 may be at least one of retrieved/recalled and determined by the behavior module 155. In regard to the first example, good driving parameters 210 and bad driving parameters 220 may be predefined via a user input via the I/O device 135 (or, via a remote source such as a fleet manager who provides the good or bad driving parameters over the network 51 to the controller 150). In this regard, each of or one or more of the good driving parameters 210 and bad driving parameters 220 may be predefined in the controller 150 for immediate or nearly immediate use of the vehicle 100.

In the latter configuration, the behavior module 155 may acquire and track vehicle operation parameter data over the course of one or more instances of driving the vehicle 100. In this regard, the tracked vehicle operation parameters may be classified into operating condition(s) associated with each parameter. The parameter data may also be indicative of one or more performance criteria, such as fuel economy. For example, on Apr. 25, 2015 the vehicle traveled from Milwaukee, Wis. to Madison, Wis. along Interstate 94 West and obtained 17 miles-per-gallon. On May 15, 2015, the same vehicle traveled from Milwaukee to Madison along Interstate 94 West and obtained 25 miles-per-gallon. Thus, if fuel economy is the designated performance criteria, the behavior module 155 may retrieve the vehicle operating parameters (e.g., vehicle speed at various parts of the route, throttle position at various parts of the route, etc.) from the latter driving instance to represent the "good driving" profile. As can be appreciated, the parameters utilized as good driving parameters 210 and bad driving parameters 220 may be based on an average value, a median value, a gain value can be applied to an average, median, or predefined value of a parameter, etc. As such, multiple passes over a similar route may be used to not only identify the good driving parameters but also to refine what constitutes "good" or "bad."

In some embodiments, the behavior module 155 may be configured to receive an explicit input for adjusting and/or defining one or more good or bad driving parameters 210, 220 for the vehicle 100 for at least one operating condition and/or performance criteria 205. Accordingly, many configurations for defining good and bad driving parameters 210, 220 are possible with all such variations intended to fall within the spirit and scope of the present disclosure.

While the good driver definition value may include the good driving parameters 210 and bad driving parameters 220, the good driver definition value may also include a definition for relating an actuator response value to an actuator input value for at least one actuator of the vehicle. Accordingly, the good driving parameters 210 and bad driving parameters 220 may include further classifications (good driver or bad driver) of an actuator input to output value at certain operating conditions and/or for certain performance criteria 205. In this regard, the good driver definition value 209 represents features or values that affect vehicle operating parameters and, consequently, performance criteria 205. That is to say, an actuator response value may adversely, positively, or have little to no impact on the designated performance criteria 205. The actuators of a vehicle 100 may include, but are not limited to, the throttle (e.g., throttle system 120), transmission 112, steering wheel/device, braking system, etc. In this regard, for an actuator input, the actuator provides an output or response. For example, in regard to the throttle system, according to a default throttle map, depression of the accelerator pedal 30% may correspond with an opening of the throttle valve of 30%. In another example, depression of a brake pedal by 10% (relative to a nominal amount) may correspond with a 10% (of the available braking force) being applied. In still another example, a gear shift to $3^{rd}$ gear at X engine speed and Y engine torque may correspond with a Z power output (for certain operating conditions). That is to say, for a given actuator input value, a corresponding actuator output response value is generated. According to the present disclosure, the controller 150 may manage (i.e., change, adjust, control, etc.) one or more of the actuator input-to-output response value relationships to teach, promote, and/or improve the driving profile of an operator.

With the above in mind, operation of the performance criteria module 154 in conjunction with the behavior module 155 may be described as follows. A user or operator designates a performance criteria 205 (e.g., via I/O device 135). The designated performance criteria 205 is transmitted to the behavior module 155, which in response, recalls good driving parameters 210 and bad driving parameters 220 that may include data regarding actuator input value-to-output values as a function of at least one of an operating condition and the designated performance criteria. In operation, the controller 150 may store a plurality of look-up tables that facilitate the quick reference/acquisition of good driving parameters and bad driving parameters as a function of both or one of the performance criteria and operating condition. In other embodiments, one or more algorithms, formulas, processes, models, and the like may be used to retrieve and/or recall the good driving parameters 210 and bad driving parameters 220.

The operating condition module 156 is structured to interpret data indicative of a current operating condition 231 of the vehicle 100. In this regard, the operating condition module 156 may include one or more vehicle operating sensors adapted to acquire operation data indicative of the operating condition 231. For example, the one or more vehicle operating sensors may include an ambient temperature sensor, an ambient pressure sensor, an altitude sensor, a wind gauge/sensor, a grade sensor, etc. In other embodiments, the operating condition module 156 may receive data indicative of the operating condition 231 from one or more of the vehicle operation sensors, such that the operating condition module 156 may include communication circuitry for coupling the module 156 to the sensors. In yet other embodiments, the operating condition module 156 receive the operating condition 231 from another source, where the other source may include an operator or passenger of the vehicle 100 (e.g., via the I/O device 135), a wireless transmission as described below in regard to the communications module 158, etc.

As such, referring further to the operating condition module 156, the operating condition module 156 is shown to include a route module 157 and a communications module 158, such that the operation condition module 156 may receive data indicative of one or more potential future operating conditions for the vehicle 100 at a future time and location. Thus, the route module 157 may be communicably coupled to the external static information source 170 while the communications module 158 is communicably coupled to the external dynamic information source 180.

The route module 157 is structured to receive route data 232 for a designated route of the vehicle in advance of the vehicle 100 traveling the route. As mentioned above, the route may be designated via the I/O device 135 and the route data 232 may include, but is not limited to, latitude data, longitude data, altitude data, a posted speed limit, signage for the route, and curvature data for the route (i.e., external static information). In this regard, the route module 157 receives an indication of the terrain conditions upcoming for the vehicle 100. To facilitate acquisition of the route data 232, the route module 157 may include a location positioning system (e.g., a global positioning system) and any sensors, data acquisitions devices, communication circuitry, etc. accompanied therewith. However, this data is largely static in nature (e.g., posted speed limits are unlikely to change, the road curvature and road grade are unlikely to change, etc.). Accordingly, the communications module 158 is structured to receive data to dynamically determine the terrain conditions upcoming or likely upcoming for the vehicle 100.

The communications module 158 may be structured to communicate with at least one of another vehicle (e.g., via short-range to medium-range wireless communication, etc.) and/or an external network or central server or database (e.g., a fleet manager, a traffic center, global positioning systems, etc.) to establish an intelligent transportation system (ITS) (e.g., vehicle-to-vehicle 182 or vehicle-to-X 184 communications). The communications module 158 may send and/or receive data regarding the vehicle 100, other vehicles, traffic conditions, road conditions, and the like. The communications module 158 may provide an operator with real-time travel and traffic information (e.g., vehicle operating conditions) via the operator I/O device 135, such as transit routes and schedules, navigation directions, and information about delays due to congestion, accidents, weather conditions, road repair work, etc. In some embodiments, the communications module 158 is able to inform an operator of vehicle 100 in real-time of his/her precise location, inform him/her of current traffic or road conditions on a current and/or surrounding roadways, and empower him/her with optimal route selection and navigation instructions. In this regard, the data provided by the communications module 158 is dynamic in that it approximates substantially real-time driving conditions (e.g., an upcoming crash that necessitates a disengagement of the drafting arrangement, etc.). Thus, the dynamic information may be used to identify or adjust one or more current and/or future potential operating conditions for the vehicle 100.

The operating parameter module 159 is structured to interpret data indicative of one or more current operating parameters 233 for the vehicle 100. Accordingly, the operating parameter module 159 may include one or more vehicle sensors including, but not limited to, an engine torque sensor, an engine speed sensor, a throttle position sensor or other actuator sensors, an intake manifold pressure sensor, an accelerator pedal position sensor, and so on. In other embodiments, the operating parameter module 159 may include communication circuitry for facilitating acquisition of data indicative of one or more current vehicle operating parameters 233. In yet another embodiment, the operating parameter module 159 may include machine-readable media for facilitate the acquisition, storage, and any other processing of the operating parameters 233. According to still further embodiments, the operating parameter module 159 may include any combination of hardware and machine-readable media.

As shown, the operating condition module 156 is communicably and operatively coupled to the operating parameter module 159. In this regard, potential future operating conditions for the vehicle may be transmitted to the operating parameter module 159. In response, the operating parameter module 159 may determine a potential future operating parameter for the vehicle 100 at a future location at a future time. This determination may be based on cross-referencing the potential future operating condition with stored operating parameters as a function of operating condition. For example, for a grade of 3% at 55 MPH, the operating parameters indicate 3 MPG. Accordingly, if the future location is at a grade of 3% and 55 MPH is a target speed, the operating parameter module 159 may determine that the vehicle 100 is likely to achieve around 3 MPG. In this regard, the operating parameter module 159 may forecast, determine, and/or predict future operating parameters at future locations at future times based on at least one of the external static and dynamic information.

The performance module 160 is communicably coupled to each of the performance criteria module 154, behavior module 155, operating condition module 156, and operating parameter module 159. Due to this coupling, the performance module 160 is structured to receive the good driving parameters 210, the bad driving parameters 220, the current and/or likely future operating conditions 231, and the current and/or likely future operating parameters 233 from the aforementioned modules.

The performance module 160 is structured to determine a performance value 270 responsive to the good driving parameters 210, bad driving parameters 220, the operating condition 231, and the operating parameter 233. The performance value 270 may be used to quantify, gauge, rate, or otherwise determine how a driver is performing with respect to the good driver definition value 209. Accordingly, the performance value 270 may be used for tracking a particular driver's performance over a predefined amount of time or distance; may be used in connection with the actuator module 161 to adjust one or more actuator response values to improve the performance of the operator; may be used in connection with the I/O module 162 to teach the operator how to improve his/her performance; may be used to classify the particular driver (e.g., a good driver, bad driver, or some scalable position); and/or, may be used to determine how the operator's performance should change to improve their performance.

The performance value 270 may be defined and determined in a variety manners. For example, the performance value 270 may be defined in absolute terms 271 (e.g., a score such as 60 out of 100), relative to one or more good operating parameters 210 and/or bad driving parameters 220 (272) (e.g., the good driving parameter indicates 20% throttle open at this particular operating condition and the current operating parameter is plus twenty percent-40% open), a change over time and/or distance 273 (e.g., the operator's performance can be tracked over time/distance to see if they are moving closer to or further from one or more good driving parameters 210), as a function of operating condition 274 (e.g., at vehicle speeds between 40 and 60 MPH, the throttle position is twenty percent above the good driving parameter throttle position while at vehicle speeds between 0 and 20 MPH, the throttle position of the driver is only five percent above the good driving parameter throttle position). Thus, the performance value 270 may be defined by a variety of different criteria. Beneficially, by including a wide variety definition criteria, the performance value 270 may be readily translatable into a useable value by the performance module 160 for determining an adjustment/response.

As mentioned above, the performance value 270 may be used to compare the driver's driving characteristics to that of the good driver profile and/or a bad driver profile to see how and where the current driver could (if needed) improve. In this regard, the performance module 160 may receive a performance function 250 that may include one or more formulas, algorithms, processes, models, look-up tables, and the like. The performance function 250 may determine improvement areas for the operator as a function of operating condition. For example, if the operator is routinely commanding 40% throttle opening (or, 40% of a rated torque output) when the predefined good driving parameter 210 indicates 20% throttle opening (e.g., 20% of a rated torque output for the engine at a particular speed) for a particular operating condition, the performance module 160 via the performance function 250 may determine this difference. Thus, the performance function 250 may be any type of function that identifies and classifies the driver (e.g., good, bad, or some scalable position), identifies areas of deficiencies in response to an operating condition and/or a performance criteria, and determines how to improve.

In regard to determining how to improve, in one embodiment, the performance module 160 may determine an absolute difference between a good driving parameter(s) and the current (or predicted at a future location) driving parameter. In another embodiment, the determination may be a time derivative. While the absolute difference may be used to provide immediate correction, a time derivative may be used to provide gradual correction to make it relatively seamless with operation of the vehicle. In still other embodiments, the performance function 250 may utilize a critical parameter tree (CPM) 251. The CPM tree 251 may include a list or "tree" of vehicle operating parameters that are substantially "critical" to or important to performance of one or more performance criteria 205. Accordingly, if the corresponding current operating parameters 231 differ from one or more of the good driving parameters 210 included in the CPM tree 251, then the performance module 160 may determine that an adjustment may be needed to one or more parameters via an actuator output response value. In this regard, the CPM tree 251 may save computing power and facilitate relative faster determinations. The CPM tree 251 may also provide a hierarchical causally related parameters. For example, in regard to fuel economy, the parameters may be related as follows: accelerator pedal depression, followed by throttle valve position, followed fuel injection amount. In this regard, by adjusting a response value for a higher ranked parameter may adjust the subsequent parameter. For example, by changing the throttle open amount as it relates to accelerator pedal depression, there is also an impact on the fuel injection amount. The CPM tree 251 may also be used to facilitate relatively fast determination (e.g., via one or more look-up tables, models, etc.) of whether a particular driver is good, bad, or some other scalable position by comparing one or more current operating parameters 231 to one or more parameters in the CPM 251. If the difference is more than an acceptable range, than the performance module 160 may determine that the driver needs improvement at a specific operating condition(s) and designated performance criteria.

It should be noted that other embodiments may utilize other, additional, and/or different types of performance functions 250 for identifying and classifying a particular driver and determining areas for improvement.

In this regard, in another embodiment, the performance function 250 may utilize fleet data 252 indicative of operating parameters for each vehicle in a fleet of vehicles 253. The fleet data 252 may be provided by the external dynamic information source 180 (e.g., downloaded from a central server) or via any other means. The fleet data 252 may include vehicle operating parameters for similar or the same vehicles for a plurality of routes. In this regard, the performance module 160 may normalize the data: e.g., aggregate the vehicle operating parameters corresponding to a specific route or portion thereof together, aggregate the vehicle operating parameters for certain operating condition(s) together, etc. The performance module 160 may then selectively identify the vehicle operating parameters from the fleet data 252 that have the best attributes for various performance criteria 205 (e.g., for a given route, which of a group of similar vehicles (e.g., type, weight, etc.) achieved the highest MPG). In turn, the performance module 160 may further identify "good" drivers 254 from the provided fleet data. The good driver definition value 209 represented by the good driving parameters 210 may then be those associated with the identified good driver(s) 254.

In this regard, the performance module 160 may utilize one or more similarity characteristics to identify the good driver(s) 254. The similarity characteristic may be used to identify similar vehicles as the vehicle 100. Accordingly, the similarity may be based on the route (e.g., start and end points, amount of road segment overlap, when the route is being travelled, terrain conditions or operating condition in general, etc.), the vehicle and components thereof (e.g., size, weight, engine size and type, similar load, etc.), experience or performance value of the driver (e.g., drivers that have similar performance value), and so on.

Identification of "good" drivers 254 for selected operating conditions and/or performance criteria may be beneficial tracking purposes as well as with improving the performance of others. For example, a fleet manager may have an incentive program for drivers who achieve the highest fuel economy for a certain route. The performance module 160 may readily identify those drivers to further providing an award via the incentive program. Moreover, if a particular driver's performance falls below a threshold but there was an extenuating circumstance that is applicable to all drivers that used that route over a certain time frame, the fleet manager may look at the statistics/parameters associated with the identified good driver 254.

Based on the performance value 270, the performance module 160 may at least one of improve operator performance with respect to one or more performance criteria 205 with little to no additional operator inputs via the actuator module 161 and/or teach the operator to become a better operator with respect to one or more performance criteria via the I/O module 162.

In regard to the first instance, the actuator module 161 may be structured to manage a response value of at least one actuator in the vehicle 100 responsive to at least one of the performance criteria 205, the operating condition or upcoming operating condition, and the performance value 270. In one embodiment, the actuator module 161 may include the one or more vehicle actuators, while in another embodiment the actuator module 161 may include machine-readable content for controlling the one or more vehicle actuators, and in still other embodiments the actuator module 161 may include any combination of actuators and machine-readable media. Based on the performance value 270 indicating that the operator is performing outside a predefined standard relative to the good driver definition value 209 for the designated performance criteria 205, the actuator module 161 may perform any of the following processes to improve performance for the operator.

In one embodiment, the actuator module 161 may re-map actuator output response values for given input values (260). For example, if the good driver definition value indicates that the throttle is at 30% open (alternatively and in regard to the diesel fueling system 125, a 30% torque command of the maximum torque amount for a given engine speed) during vehicle speeds of 55 MPH and 65 MPH on 3% grade for achieving a high fuel economy and the operator is commanding a 50% throttle opening (e.g., 50% torque command of the maximum torque for the given engine speed) for the similar operating conditions, the actuator module 161 may re-map the operator's input command which originally corresponded with 50% opening to 30% opening. In another example, if for a particular segment of a route, the identified good driver from the fleet is shown to operate his/her vehicle at 57 MPH, then, the actuator module 161 may adjust a speed-to-accelerator pedal depression (for example, via the throttle system 120) to substantially achieve 57 MPH for the vehicle 100 for a given accelerator pedal depression. In still another example, if the identified good driver is shown to apply 30% braking power for an upcoming curve of the designated route of the vehicle 100, the actuator module 161 may re-map the brake pedal-to-braking force relationship to ensure or substantially ensure a 30% output braking force. In each example, an actuator output response value (e.g., throttle valve position, torque command, vehicle speed based on accelerator pedal depression, and braking system) is adjusted or managed for a given actuator input value to achieve a desired performance criteria or, in certain embodiments, to move operation of the vehicle closer to the identified good driving definition value. Advantageously, in each example, the operator may realize an improvement in one or more operating parameters (e.g., better fuel economy) without changing his/her driving style.

Still another example may be in response to a vehicle slow down operating condition (a current operating condition or predicted likely future operating condition), the actuator module 161 reduces the engine torque output for a pre-defined throttle position on the throttle map to slow the vehicle down. In this regard, the vehicle slows down to substantially alleviate a need for vehicle braking. Yet another example may be where the throttle map includes two or more throttle maps. Accordingly, the actuator module 161 may interpolate between the two or more throttle maps based on the operating condition (current or future). In each example, the actuator module 161 is re-mapping the throttle map; that is to say, the actuator module 161 is altering, managing, controlling, or adjusting the throttle map to help the driver achieve the good driver definition value 209.

The re-mapping may be in absolute terms 261. For example, if the good driver definition value indicates that a 30% open position of the throttle valve and the current valve position is 20% open, then the valve may be opened an additional 10%. In this configuration, the actuator module 161 may utilize a difference comparator with respect to the good driver definition value 209. The re-mapping may also utilize a gain value addition in order to dampen the response rate.

The re-mapping may also be performed as a function of operating condition (262). For example, at a certain operating condition (e.g., a grade amount, a curvature amount, an altitude level, etc.), the good driver definition value 209 may indicate that the actuator response should be X (e.g., the throttle valve should be X percent closed/open). In response to the determined operating condition (or, the likely potential upcoming operating condition at the future time and location based on, e.g., the static and/or dynamic external information), the actuator module 161 may adjust an actuator output response value to align, equal, substantially equal, etc. the good driver definition for the current or likely upcoming operating condition. Beneficially, this configuration may allow the actuator module 161 to dynamically adjust actuator response values as a function of operating condition, such that the operation of the vehicle 100 may be optimized with respect to one or more designated performance criteria 205.

The re-mapping may also be performed as a rate, where the rate may be a function of time or distance (263). Accordingly, in one embodiment, the response may be based on a time derivative, such that adjustments may be implemented for determined changes to one or more actuator response values to occur over time. This functionality may make any change gradual in nature to reduce any noticeable operating effects on the operator, which may be appealing to the operator. In a similar embodiment, the response may be changing with distance such that a similar type of gradual change may be implemented with one or more actuator response values. In each case, the rate may be relatively fast or relatively gradual to reduce noticeability and appeal to operator driving preferences.

According to another embodiment, the re-mapping may be fully or only partially implemented. That is to say, the entire map (i.e., throttle map or torque command map for a diesel engine) may be managed; or, only a portion of the map may be managed. In one embodiment, the portion of the map managed is based on a selected engine speed range, wherein the speed range corresponds with approximately 1100 RPM and 1400 RPM. In another embodiment, any other engine speed range may be utilized. In still another embodiment, another characteristic may be used to control which portion of the map is adjusted (e.g., a certain torque range, only remap when the vehicle is in a certain transmission setting or settings, etc.). Advantageously, this feature may provide selective re-mapping which may enhance performance of the vehicle.

It should be understood that the same or similar type of principles may be used with a diesel fueling control system for remapping torque commands (i.e., a torque command map) for a given accelerator pedal position to dynamically change fueling commands to control power output, emissions characteristics, operability, and any other performance criteria.

As mentioned above, the identified good driver(s) 254 from the fleet may be used to generate the good driver definition value 209 comprising the good driving parameters 210 and the actuator input-to-output response values. In certain embodiments, a "good driver" may operate the vehicle followed by a "bad driver" and vice versa; however, the identity of each driver—good or bad—is known in some cases and unknown in others. Accordingly, the rate of re-mapping may also be based on driver identification. The re-mapping may occur relatively faster for known drivers than for unknown drivers. That is to say, for a known or identified driver, the re-mapping occurring with that driver may occur relatively faster because the driver may have indicated an acceptance to this action whereas the unknown driver may be uncomfortable with such action and the re-mapping may occur slower. Or, the re-mapping for the unknown driver may only happen based on explicit driver authorization. Nonetheless, this rate of re-mapping may provide custom tailoring to identified drivers.

According to one embodiment, the controller 150 may be structured to receive an override input at any time during operation of the vehicle. The override input may be used to stop the re-mapping process. The override input may also be used to reset the re-mapped values to the default setting. The override input may also be used to control various configurability options, such as what actuator input-to-output response values are re-mapped (e.g., only the throttle valve, only the brakes, only the throttle and brakes, etc.), when the re-mapping can occur (e.g., only on designated routes, etc.), and so on.

While the actuator module 161 may facilitate improvement of driver performance with little to no input from the operator, the I/O module 162 via the performance module 160 may facilitate teaching the operator how to improve. Accordingly, the I/O module 162 may include the I/O device 135, include communication circuity for communicably and operatively coupling the I/O device 135 to the I/O module 162, include machine-readable content for receiving a determination from the performance module 160 and providing an output, and/or some combination therewith. In this regard, rather than re-mapping, the I/O module 162 may provide an indication to the operator to adjust their performance to achieve or facilitate achievement of the good driver definition value 209.

For example, the I/O module 162 may provide a recommendation 280 via the I/O device 135. The recommendation 280 may instruct the operator what to do and the likely consequences of that action. For example, the I/O device 135 may display or audibly state that "in order to achieve better fuel economy, please reduce the accelerator pedal depression" (and the I/O module 162 may also indicate when to stop the reduction in order to substantially maintain a given vehicle speed). In this case, the actuator output response value may be unchanged where it is up to the operator to choose to take the recommendation or not to affect the output response.

The driver recommendation 280 may be based on current performance 281 of the operator. In this regard, this performance module 160 may compare the current performance to the good driver definition value 209 in order to make recommendations.

The driver recommendation 280 may also be based on likely future performance 282 of the operator. Future performance may be determined using one or more trajectory algorithms, formulas, processes and the like. In this regard, future performance may be indicative of a trend of performance for the operator with respect to one or more performance criteria 205. For example, the trend may indicate that the operator is improving fuel consumption and at this trend, the projection may indicate that the operator will have achieved the good driver definition value in three months. However, if that timing is untenable for whatever reason (e.g., as mandated by a fleet manager, for the operator's own personal reasons, etc.), the driver recommendation may provide one or more suggestions to the operator for improving his/her trajectory in the hopes of achieving the good driver definition value in advance of the 3-month trajectory.

The driver recommendation 280 may also include a substitute 283. The substitute 283 may provide an indication of a change of operator controls or driving patterns to aid in obtaining the good driver definition value 209. In this regard, while the operator may be able to achieve the good driver definition value 209 more quickly through a first maneuver (e.g., reduce the rate of accelerator pedal depression to accelerate the vehicle to, e.g., achieve better fuel economy), the substitute 283 suggestion may inform the operator when to coast and/or apply brakes in order to achieve better fuel economy over the duration of the trip. In this regard, the performance module 160 may recognize that some operating parameters (e.g., the ability to accelerate) may be desired to be left unchanged by some operators and, in response, may make substitute suggestions to achieve one or more performance criteria 205.

The driver recommendation 280 may also include a recommendation weight 284, where the recommendation weight 284 provides an indication of the certainty that the recommendation 280 will or is likely to be effective in achieve the one or more designated performance criteria 205 (and in certain embodiments, a time frame or duration to achieve or substantially achieve the designated performance criteria 205). Accordingly, one or more statistical processes (e.g., confidence intervals, etc.) may be utilized to determine the likely efficacy of the recommendation 280.

It should be understood that the aforementioned driver recommendation processes are not meant to be exhaustive as many other driver recommendation methodologies may be employed with the controller 150 with all such methodologies intended to fall within the spirit and scope of the present disclosure.

For example and in one embodiment, the I/O module 162 via the performance module 160 may provide a haptic command 290 to the operator to promote, teach, push, and/or otherwise induce the operator to change his/her operation to achieve the good driver definition value 209. The haptic command 290 is any type of haptic command (e.g., feedback that utilizes motion such as vibrations, forces, etc.) to provide feedback to the operator. For example, if the good driver definition value indicates that the throttle valve should be slightly closed to achieve better fuel economy at these operating conditions, a vibrational motor attached to the accelerator pedal in the vehicle 100 may be actuated to started vibrating. The vibrating may indicate that the user should reduce (or generally change) the depression amount of the accelerator pedal in order to promote the slight closing. The vibration may continue until the good driver definition value is achieved or substantially achieved. While described in regard to the accelerator pedal, the haptic command may be implemented in other components. In one embodiment, the haptic command 290 may be implemented in each control mechanism where improvement is determined to be needed. For example, on road curves of slight curvature, current performance may indicate that the operator is rarely applying the brakes in order to achieve quick traversal of the route. However, the operator may have defined a performance criteria of minimizing wear on the tires and the good driver definition value, based on this designation, may indicate that the driver should be applying at least X amount of braking force (which may correspond with a depression amount of X amount of the brake pedal). Accordingly, the brake pedal may vibrate when the operator is traveling curves of this nature and not depressing by the brake pedal by X amount. In another example, if the operator drives the vehicle laterally (i.e., side-to-side) too close to another vehicle based on the good driver definition value, the steering wheel may vibrate. In still another example, for a given operating condition, if the good driver definition value indicates that the user should be in a different transmission setting, the transmission shifter may vibrate. Of course, the present disclosure contemplates a wide variety of additional or different haptic commands that may be provided to improve operator performance.

Figure 3:
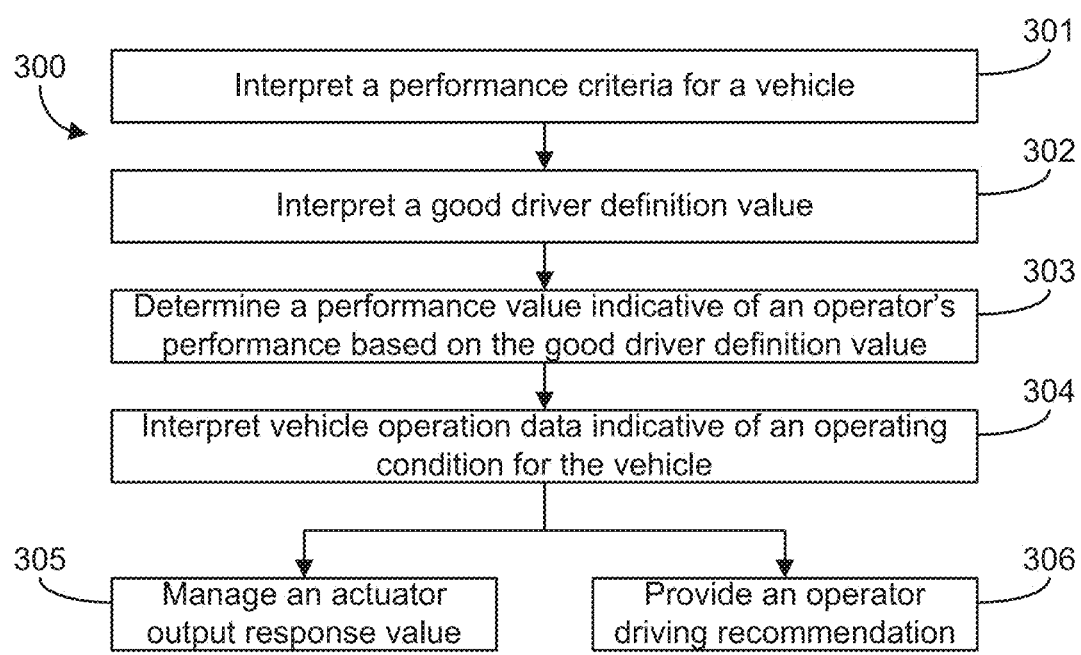
FIG. 3 is a flow diagram of a method of improving performance of an operator of a vehicle, according to an example embodiment.

Referring now to FIG. 3, a flow chart of a method 300 of improving operator performance is shown according to an exemplary embodiment. The method 300 may be implemented using the controller 150 of FIGS. 1-2. Accordingly, method 300 is described with reference to FIGS. 1-2.

At process 301, a performance criterion for a vehicle is interpreted. The performance criteria may have the same or similar designation as that described above in regard to the performance criteria 205. Accordingly, the performance criteria may include, but is not limited to, a fuel economy or consumption rate; a wear/maintenance value; an emissions value (e.g., a NOx emissions threshold for transient operating conditions (e.g., acceleration conditions) and steady-state conditions (e.g., cruise control operation), a particulate matter emissions amount that is acceptable, etc.); an acceleration characteristic (e.g., acceleration from 0-60 miles-per-hour, accelerate from 55-60 MPH, etc.); a value for transmission shifts (e.g., a desire to reduce/have infrequent transmission shifts due to the loss of power in between shifts and the relatively worse fuel economy realized from a high number of transmission shifts); etc.

At process 302, a good driver definition value is interpreted. In one embodiment, the good driver definition value is based on the designated performance criteria. In another embodiment, the good driver definition value is based on operating condition. In yet another embodiment, the good driver definition value is based on good driving parameters that may be independent of performance criteria and operating condition (e.g., a predefined good driver). In still another embodiment, the good driver definition value may be based on some combination of performance criteria and operating condition. Thus, the good driver definition value may be structured like the good driver definition value 209.

At process 303, a performance value for the operator is determined. The performance value provides an indication of how the operator is performing with respect to the good driving definition value. Accordingly, the performance value may indicate whether the vehicle operator is operating in accord with the good driver definition value or not. The performance value may have the same or similar structure to that described above (i.e., performance value 270). Accordingly, the performance value may be time-based, distance-based, based on current operation, based on likely future operation, etc.

At process 304, vehicle operation data indicative of an operating condition for the vehicle is interpreted. The operating condition may be a current operating condition, such that the operation data may be acquired by one or more vehicle sensors (e.g., grade sensor, etc.). The operating condition may also be a likely future condition at a future time, such that the operating condition determination may be based on external static and/or dynamic information.

Based on the foregoing, method 300 can either perform one or both of processes 305 and 306. This designation may be based on one or more user inputs and can vary from application-to-application.

At process 305, an actuator output response is managed. Process 305 corresponds with a nearly self-automated driver improvement process by managing at least one actuator response value for a given actuator input command or value. In this regard, the management may be done with little to no operator input, such that the operator may be unaware of the adjustment. For example, if the operator desires to achieve better fuel economy and the performance value indicates that operator is consistently commanding a greater throttle valve open position than that of the good driver definition value for various operating conditions, then process 305 may re-map the given actuator input value (i.e., what the operator has been routinely doing in the past) to the good driver definition output value (i.e., the good driver definition valve position), such that the next time the operator is driving the vehicle along this condition and provides the given actuator input command, the re-mapped output response is provided. Beneficially, the operator may realize a relatively greater fuel economy (or other designated performance criteria) than experienced in the past. However, as described above, the re-mapping of actuator response values can be based on other actuators in addition to and in place of the throttle system. Accordingly, the aforementioned description is not meant to be limiting.

Process 305 may be implemented in response to the performance value indicating that the operator does not meet the good driver definition value with response to one or more good driving parameters. Additionally or in place of, process 305 may be implemented in response to the value indicating that the vehicle is not achieving, satisfying, or meeting the designated performance criteria, which indicates that the operator can improve in at least one area of operation.

In certain embodiments, the operator may desire to learn how to improve his/her driving skills with respect to one or more performance criteria and, as such, may wish to implement process 306 in addition to or in place of process 305.

Accordingly, at process 306, an operator driving recommendation is provided. The driving recommendation may be provided by the I/O device 135 to the operator. The driving recommendation may have the same or similar configuration as the recommendation 280 described above. In this regard, the recommendation 280 may help to improve operator performance with respect to one or more performance criteria.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   receiving, by a processing circuit, fleet data regarding operation of a plurality of vehicles;
   determining, by the processing circuit, a driver definition value for an operator of a respective vehicle based on the fleet data, wherein the driver definition value is determined for the respective vehicle based on operation of at least one vehicle in the plurality of vehicles having a characteristic similar to the respective vehicle, wherein the characteristic includes at least one of a designated operating condition, a similar terrain condition, or a similar route;
   interpreting, by the processing circuit, vehicle operation data indicative of an operating parameter of the vehicle;
   determining, by the processing circuit, a performance value indicative of how the operator of the respective vehicle is performing with respect to the driver definition value based on the operating parameter of the respective vehicle;
   providing, by the processing circuit, a notification to the operator requesting approval to remap an actuator response map of at least one actuator of the respective vehicle in response to the performance value indicating that the respective vehicle is not satisfying the driver definition value;
   receiving, by the processing circuit, an authorization to remap the actuator response map from the operator; and
   remapping, by the processing circuit, the actuator response map after receiving the authorization such that an actuator response of the at least one actuator for a respective operator input is actively altered to facilitate achievement of the driver definition value.

2. The method of claim 1, wherein the at least one actuator includes a throttle system having a throttle valve.

3. The method of claim 2, wherein the actuator response map includes a throttle map.

4. The method of claim 3, wherein the throttle system has the throttle map that relates how far open the throttle valve actuates for a respective throttle valve open command, wherein remapping the actuator response map includes remapping the throttle map by adjusting an open amount for a given throttle valve open command to facilitate achievement of the driver definition value.

5. The method of claim 1, wherein the at least one actuator includes a fueling control system having an accelerator pedal.

6. The method of claim 5, wherein the actuator response map includes a fueling system map.

7. The method of claim 6, wherein the fueling control system has the fueling system map that relates a position of the accelerator pedal to (i) a torque demand for a given engine speed and (ii) a fueling command to achieve the torque demand, wherein remapping the actuator response map includes remapping the fueling system map by adjusting the fueling command for a given position of the accelerator pedal to facilitate achievement of the driver definition value.

8. The method of claim 1, wherein a rate of remapping the actuator response map is based on driver identification such that the actuator response map for known, identified drivers is remapped at a different rate than unknown, identified drivers.

9. A system, comprising:
an actuator; and
a controller structured to:
  determine or acquire a driver definition value;
  interpret vehicle operation data indicative of an operating parameter of a vehicle;
  determine a performance value based on the operating parameter of the vehicle, the performance value indicative of how an operator of the vehicle is performing with respect to the driver definition value;
  provide a notification to the operator requesting approval to remap a response map of the actuator in response to the performance value indicating that the vehicle is not satisfying the driver definition value;
  receive an authorization to remap the response map from the operator; and
  remap the response map after receiving the authorization such that a response of the actuator for a respective operator input is actively altered to facilitate achievement of the driver definition value;
  wherein a rate of remapping the response map is based on identification of the operator such that the response map is remapped at a different rate if the operator is a known identified operator of the vehicle than if the operator is an unknown identified operator of the vehicle.

10. The system of claim 9, wherein the operating parameter includes at least one of a fuel economy value, an emissions value, an acceleration value, a braking value, or a wear value.

11. The system of claim 9, wherein the actuator includes a throttle system having a throttle valve, wherein the response map includes a throttle map that relates how far open the throttle valve actuates for a respective throttle valve open command, and wherein the controller is structured to remap the throttle map by adjusting an open amount for a given throttle valve open command to facilitate achievement of the driver definition value.

12. The system of claim 9, wherein the actuator includes a fueling control system having an accelerator pedal, wherein the response map includes a fueling system map that relates a position of the accelerator pedal to (i) a torque demand for a given engine speed and (ii) a fueling command to achieve the torque demand, and wherein the controller is structured to remap the fueling system map by adjusting the fueling command for a given position of the accelerator pedal to facilitate achievement of the driver definition value.

13. The system of claim 9, wherein the controller is further structured to monitor an operating condition of the vehicle, the operating condition including at least one of an ambient temperature, an ambient pressure, an altitude, a route, or a wind speed, wherein the performance value or the driver definition value is determined based further on the operating condition of the vehicle.

14. An apparatus comprising:
a control circuit structured to:
  interpret vehicle condition data indicative of an operating condition imparted onto a vehicle from a surrounding environment;
  determine a driver definition value based on the operating condition;
  interpret vehicle operation data indicative of an operating parameter of the vehicle, the operating parameter including at least one of a fuel economy value, an emissions value, an acceleration value, a braking value, or a wear value;
  determine a performance value based on the operating parameter and the operating condition, the performance value indicative of how an operator of the vehicle is performing with respect to the driver definition value;
  provide a notification to the operator requesting approval to remap an actuator response map of an actuator of the vehicle in response to the performance value indicating that the vehicle is not satisfying the driver definition value;
  receive an authorization to remap the actuator response map from the operator; and
  remap the actuator response map only after receiving the authorization such that, for subsequent operator inputs for the actuator of the vehicle, a response of the actuator is different than prior to the remapping to facilitate achievement of the driver definition value during future vehicle operations.

15. The apparatus of claim 14, wherein the control circuit is structured to receive performance criteria regarding preferred operation of the vehicle, wherein the driver definition value is determined based on the performance criteria, and wherein the performance criteria includes at least one of a preferred fuel economy value, a preferred emissions value, a preferred acceleration value, a preferred braking value, or a preferred wear value.

16. The apparatus of claim 14, wherein the operating condition includes at least one of an ambient temperature, an ambient pressure, an altitude, a route terrain, a route grade, a route curvature, a weather condition, or a wind speed.

* * * * *